United States Patent
Yoshioka

(10) Patent No.: US 10,101,463 B2
(45) Date of Patent: Oct. 16, 2018

(54) CORRELATION PROCESSING METHOD, CORRELATION PROCESSING CIRCUIT

(71) Applicant: Seiko Epson Corporation, Tokyo (JP)

(72) Inventor: Hiroki Yoshioka, Matsumoto (JP)

(73) Assignee: Seiko Epson Corporation (JP)

(*) Notice: Subject to any disclaimer, the term of this patent is extended or adjusted under 35 U.S.C. 154(b) by 322 days.

(21) Appl. No.: 15/041,528

(22) Filed: Feb. 11, 2016

(65) Prior Publication Data

US 2016/0238713 A1  Aug. 18, 2016

(30) Foreign Application Priority Data

Feb. 12, 2015 (JP) ................................ 2015-025754

(51) Int. Cl.
*G01S 19/37* (2010.01)
*G01S 19/22* (2010.01)
*G01S 19/30* (2010.01)

(52) U.S. Cl.
CPC .............. *G01S 19/37* (2013.01); *G01S 19/22* (2013.01); *G01S 19/30* (2013.01)

(58) Field of Classification Search
CPC ........... G01S 19/37; G01S 19/22; G01S 19/30
See application file for complete search history.

(56) References Cited

U.S. PATENT DOCUMENTS

| | | |
|---|---|---|
| 5,101,416 A | 3/1992 | Fenton et al. |
| 5,390,207 A | 2/1995 | Fenton et al. |
| 5,495,499 A | 2/1996 | Fenton et al. |
| 5,734,674 A | 3/1998 | Fenton et al. |
| 5,809,064 A | 9/1998 | Fenton et al. |
| 6,243,409 B1 | 6/2001 | Fenton et al. |
| 6,493,378 B1* | 12/2002 | Zhodzishsky ........... G01S 19/22 375/149 |
| 6,744,404 B1* | 6/2004 | Whitehead .............. G01S 19/22 342/357.61 |
| 8,503,578 B2 | 8/2013 | Chen |
| 8,571,088 B2* | 10/2013 | Pon ......................... G01S 19/30 342/357.26 |

FOREIGN PATENT DOCUMENTS

| | | |
|---|---|---|
| JP | 04-269682 A | 9/1992 |
| JP | 11-142502 A | 5/1999 |
| JP | 2010-519527 A | 6/2010 |

* cited by examiner

*Primary Examiner* — Gregory C. Issing

(74) *Attorney, Agent, or Firm* — Harness, Dickey & Pierce, P.L.C.

(57) ABSTRACT

A correlation processing method includes generating a correlation code in which a code value of a chip boundary period is set to a value of a replica code, and a code value of a chip center period other than the chip boundary period is set to a predetermined value, and performing a correlation calculation with respect to the correlation code and a received code signal obtained by demodulating a received signal from a positioning satellite.

10 Claims, 17 Drawing Sheets

[CHIP PERIOD SETTING DATA] 332

| CHIP BOUNDARY PERIOD | 0.0~0.1, 0.9~1.0 CHIP PERIOD |
|---|---|
| CHIP CENTER PERIOD | 0.1~0.9 CHIP PERIOD |

FIG. 6

CORRELATION PROCESSING METHOD, CORRELATION PROCESSING CIRCUIT

CROSS-REFERENCE

This application claims priority to Japanese Patent Application No. 2015-025754, filed Feb. 12, 2015, the entirety of which is hereby incorporated by reference.

BACKGROUND

1. Technical Field

The present disclosure relates to a correlation processing method with respect to a positioning satellite signal.

2. Related Art

Currently, various satellite positioning systems such as a Global Positioning System (GPS), a Quasi Zenith Satellite System (QZSS), a GLObal NAvigation Satellite System (GLONASS), a BeiDou Navigation Satellite System, and Galileo have been known as satellite positioning systems using a satellite signal.

In such a satellite positioning system, a multipath is one of the largest factors of a positioning error. The multipath is a phenomenon in which an indirect wave signal of the satellite signal due to reflection, diffraction, or the like with respect to a building or the ground is strongly involved and received as a received signal of the satellite signal. Therefore, a technology has been known, as an example of a technology for reducing the positioning error due to the multipath, in which a part of a replica code, specifically, a code value of a portion other than the vicinity of bit transition, is set to an invalid value (zero), and a code in which the positive and negative of a code value of a portion in the vicinity of the bit transition is replaced is set to a correlation code, and thus, a correlation value relevant to the indirect wave signal is reduced (for example, refer to JP-A-11-142502).

In the technology disclosed in JP-A-11-142502, a correlation calculation is performed by using the correlation code in which a part of the replica code is set to the invalid value (zero), and thus, a correlation value to be obtained becomes small. As a result thereof, it is difficult to detect a peak of the correlation value, and thus, reception sensitivity deteriorates.

SUMMARY

An advantage of some aspects of the disclosure is to provide a novel method of reducing the influence of the multipath.

A first aspect of the disclosure is directed to a correlation processing method including generating a correlation code in which a code value of a chip boundary period is set to a value of a replica code, and a code value of a chip center period other than the chip boundary period is set to a predetermined value; and performing a correlation calculation with respect to a received code signal obtained by demodulating a received signal from a positioning satellite and the correlation code.

As another aspect of the disclosure, the disclosure may be configured as a correlation processing circuit including a correlation code generator generating a correlation code in which a code value of a chip boundary period is set to a value of a replica code, and a code value of a chip center period other than the chip boundary period is set to a predetermined value; and a correlator performing a correlation calculation with respect to a received code signal obtained by demodulating a received signal from a positioning satellite and the correlation code.

As still another aspect of the disclosure, the disclosure may be configured as a program causing a computer to execute generating a correlation code in which a code value of a chip boundary period is set to a value of a replica code, and a code value of a chip center period other than the chip boundary period is set to a predetermined value; and performing a correlation calculation with respect to a received code signal obtained by demodulating a received signal from a positioning satellite and the correlation code.

According to the first aspect or the like, the correlation code in which the code value of the chip boundary period is set to the value of the replica code, and the code value of the chip center period other than the chip boundary period is set to the predetermined value, is used as a correlation code for performing the correlation calculation with respect to the received code signal. Accordingly, it is possible to reduce an influence of a multipath.

As a second aspect, the correlation processing method according to the first aspect may be configured such that the generating includes generating the correlation code by setting the code value of the chip center period to zero.

According to the second aspect, the code value of the chip center period of the correlation code becomes zero. That is, the correlation value corresponding to the chip center period becomes zero, and thus, only the correlation value of the chip boundary period becomes valid. Accordingly, it is possible to reduce the influence of the multipath which appears on the correlation value between the received code signal and the correlation code.

As a third aspect, the correlation processing method according to the first aspect may be configured such that the generating includes generating the correlation code by setting at least a first code value of the chip center period to repetition of the value of the replica code and zero.

According to the third aspect, at least the first code value of the chip center period of the correlation code is set to the repetition of the value of the replica code and zero. Accordingly, it is possible to suppress the reduced amount of the correlation value to be obtained, compared to a case where the code value of the chip center period of the correlation code is set to zero.

As a fourth aspect, the correlation processing method according to the third aspect may be configured such that the generating includes generating the correlation code by setting the code value of the chip center period to the repetition of the value of the replica code and zero.

According to the fourth aspect, the code value of the chip center period of the correlation code is set to the repetition of the value of the replica code and zero. Accordingly, it is possible to suppress the reduced amount of the correlation value to be obtained, compared to a case where the code value of the chip center period of the correlation code is set to zero.

As a fifth aspect, the correlation processing method according to the third aspect may be configured such that the generating includes generating the correlation code by setting a code value of the first half of the chip center period to the repetition of the value of the replica code and zero, and by setting a code value of the latter half of the chip center period to zero.

According to the fifth aspect, in the correlation code, the code value of the first half of the chip center period is set to the repetition of the value of the replica code and zero, and the code value of the latter half of the chip center period is set to zero. The indirect wave signal becomes a signal which is delayed with respect to a direct wave signal, and thus, in a multipath signal, a component of the indirect wave signal is mainly included in the latter half period of each chip. For this reason, by setting the code value of the latter half of the chip center period of the correlation code to zero, it is possible to effectively reduce the influence of the multipath which appears on the correlation value between the received code signal and the correlation code.

BRIEF DESCRIPTION OF THE DRAWINGS

The disclosure will be described with reference to the accompanying drawings, wherein like numbers reference like elements.

FIG. 6 is a data configuration example of chip period setting data.

DESCRIPTION OF EXEMPLARY EMBODIMENTS

Hereinafter, an example of an embodiment to which the disclosure is applied will be described. In this embodiment, a GPS will be described as an example of a satellite positioning system, but the disclosure may be applied to other satellite positioning systems.

Outline

A GPS satellite signal to be transmitted from a GPS satellite is a signal in which a navigation message including satellite orbital information, such as the almanac or ephemeris is subjected to spectrum spread modulation by a Coarse and Acquisition (C/A) code which is one type of spread code, and is superimposed on a carrier wave of 1.57542 [GHz]. The C/A code is a pseudo random noise code having a repetition period of 1 millisecond in which a chip having a code length of 1023 is set to a 1 PN frame, and is a code which is intrinsic to each GPS satellite.

A GPS receiver captures a GPS satellite signal by performing a correlation calculation with respect to a received signal of the GPS satellite signal and a replica code which is a pseudo C/A code generated in the receiver, and obtains a position error of the GPS receiver or an error of a timepiece on the basis of the navigation message which is carried by being superimposed on the captured GPS satellite signal.

A frequency (a carrier frequency) when the GPS satellite transmits the GPS satellite signal is defined in advance as 1.57542 [GHz], and a receiving frequency which is a frequency when the GPS receiver receives the GPS satellite signal is not necessarily coincident with the defined carrier wave frequency, due to the influence of the Doppler effect or the like generated by the movement of the GPS satellite or the GPS receiver. For this reason, the GPS receiver performs the correlation calculation with respect to the received signal and the replica code while changing the frequency and the phase of the replica code, and detects a peak of the obtained correlation value, and thus, specifies the receiving frequency and a code phase.

Figure 1:
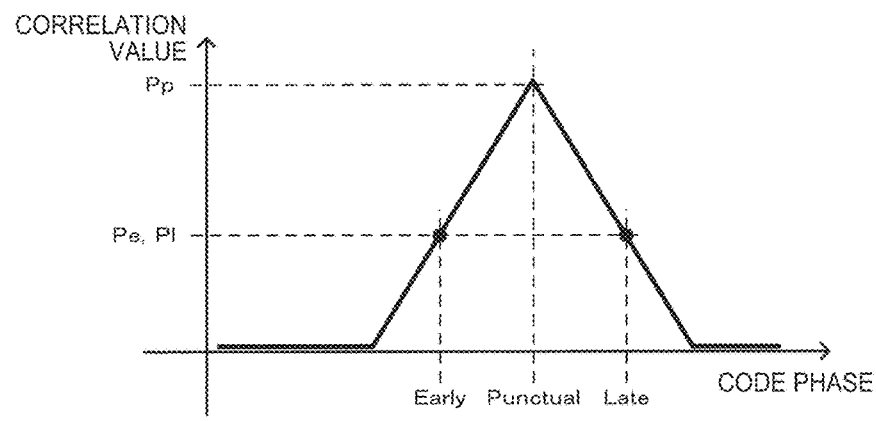
FIG. 1 is an explanatory diagram of peak detection of a correlation value.

FIG. 1 is an explanatory diagram of detection of a phase (a peak phase) at which the correlation value has a peak. FIG. 1 illustrates an example of a self-correlation value of the C/A code in which a horizontal axis indicates the code phase and a vertical axis indicates the correlation value. The self-correlation value is referred to as a correlation value between an ideal received signal of the GPS satellite signal and the replica code. Furthermore, the correlation value indicates the size of the correlation value (the absolute value).

The self-correlation value of the C/A code, for example, is approximately in the shape of a symmetrical triangle having a peak value (the maximum value) as the vertex. That is, a correlation value in a phase which is delayed from the peak phase by the same amount is identical to a correlation value in a phase which is advanced from the peak phase by the same amount. For this reason, when a correlation value in a phase (a Late phase) which is delayed with respect to a code phase (a Punctual phase) which is currently tracked by a certain amount, and a correlation value in a phase (an Early phase) which is advanced with respect to the punctual phase by a certain amount are used, it is possible to specify the code phase. That is, by searching a phase at which the correlation value of the Late phase (a Late correlation value) is identical to the correlation value of the Early phase (an Early correlation value), it is possible to detect the Punctual phase as the peak phase.

However, in a multipath environment, a signal (a multipath signal) in which the indirect wave signal such as a reflection wave reflected on the building or the ground, a transmission wave transmitted through an obstacle, and a diffraction wave diffracted by the obstacle is superimposed on the direct wave signal which is the GPS satellite signal transmitted from the GPS satellite is received by the GPS receiver.

Figure 2:
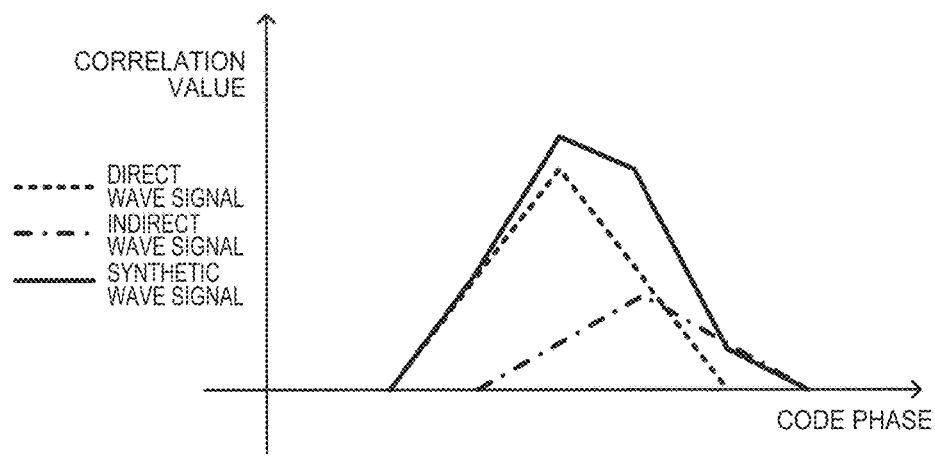
FIG. 2 is an example of a correlation value with respect to a multipath signal.

FIG. 2 is a diagram illustrating an example of a correlation result with respect to the multipath signal. FIG. 2 illustrates an example of a graph of the correlation value with respect to each of the direct wave signal, the indirect wave signal, and a synthetic wave signal (the multipath signal) of the direct wave signal and the indirect wave signal in which a horizontal axis indicates the code phase and a vertical axis indicates the correlation value.

The correlation value with respect to the indirect wave signal is approximately in the shape of a triangle, as with the correlation value with respect to the direct wave signal, but the size of the peak value (a correlation peak value) is smaller than the correlation peak value of the direct wave signal, and the peak phase is slower than the peak phase of the direct wave. This is because the signal intensity of the GPS satellite signal transmitted from the GPS satellite becomes weak by being reflected on the building or the ground or by being transmitted through the obstacle, or a propagation distance becomes long.

Then, the correlation value with respect to the multipath signal becomes the sum of the correlation value of the direct wave signal and the correlation value of the indirect wave signal, and thus, the peak phase is identical to the peak phase of the direct wave signal, but inclinations on the right and left of the peak phase are different from each other. Specifically, the correlation peak value of the indirect wave signal is delayed with respect to the correlation peak value of the direct wave signal, and thus, the inclination of the correlation value with respect to the multipath signal on the Late phase side is deformed, and the length of the inclination in a code phase direction becomes long. For this reason, the Punctual phase of the multipath signal is not coincident with the peak phase. That is, in the multipath environment, when the code phase is specified by detecting the peak of the correlation value between the received signal and the replica code, an error is able to be generated in the code phase to be specified. This is the influence of the multipath environment.

Therefore, in this embodiment, the influence of the multipath environment is reduced, and thus, a correlation code is newly generated on the basis of the replica code of the GPS satellite which is a capturing target, the correlation calculation is performed not with respect to the replica code but with respect to the correlation code and the received signal from the GPS satellite, and the satellite signal is captured. In this embodiment, there are three specific examples according to a difference in the correlation code to be newly generated.

Common Configuration of Examples

A portable electronic device having a GPS receiving function will be described as an example of a configuration of a device common in three examples. The portable electronic device, for example, is able to be configured as a smart phone or a mobile telephone, a laptop, a wristwatch type device, smart glasses, and the like. In addition, the portable electronic device is able to be configured as a portable navigation device. In addition, the portable electronic device is able to be applied to a vehicle navigation system.

Figure 3:
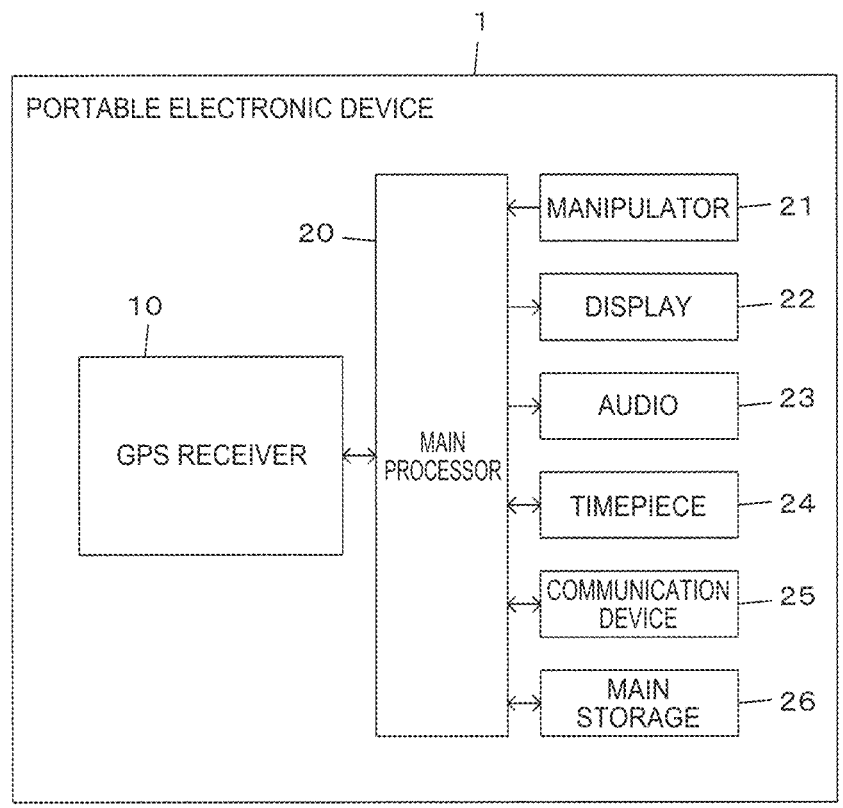
FIG. 3 is a functional configuration diagram of a portable electronic device which is a common configuration of each example.

FIG. 3 is a functional configuration diagram of a portable electronic device 1 having a GPS receiving function. As illustrated in FIG. 3, the portable electronic device 1 includes a GPS receiver 10, a main processor 20, a manipulator 21, a display 22, an audio 23, a timepiece 24, a communication device 25, and a main storage 26.

The GPS receiver 10 receives the GPS satellite signal, and calculates a position error of the GPS receiver 10 or an error of the timepiece on the basis of a navigation message, such as orbital information of the GPS satellite which is carried, by being superimposed on the received GPS satellite signal. The GPS receiver 10 includes a baseband processing circuit as a correlation processing circuit performing correlation processing.

In addition, the GPS receiver 10 is able to adopt configurations of GPS receivers 10A to 10C according to the three examples. Each of the examples will be described below in detail.

The main processor 20 is an operation processing device configured of a processor such as a CPU, and integrally controls each unit of the portable electronic device 1 according to various programs such as a system program stored in the main storage 26. In addition, various processings are executed on the basis of the positioning result of the GPS receiver 10. For example, a time difference from a standard time is calculated by displaying a current position, by correcting a time calculated by the timepiece 24, or by determining a time zone corresponding to the current position, and thus, it is possible to correct the time calculated by the timepiece 24 to a time corresponding to a local area.

The manipulator 21 is an input device configured of a touch panel or a button switch, and outputs a manipulation signal according to the manipulation of a user to the main processor 20. The display 22 is a display device configured of a Liquid Crystal Display (LCD) or the like, and performs various displays based on a display signal from the main processor 20. The audio 23 is a sound output device configured of a speaker or the like, and performs various sound outputs based on the sound signal from the main processor 20.

The timepiece 24 is an internal timepiece, is configured of an oscillation circuit including a crystal oscillator and the like, and measures a time which has elapsed from a current time or a designated timing. The communication device 25 is a wireless communication device such as a wireless Local Area Network (LAN) or Bluetooth (Registered Trademark), and performs communication with respect to an external device.

The main storage 26 is a storage device configured of a Read Only Memory (ROM), a Random. Access Memory (RAM), and the like, stores a program or data for realizing various functions of the portable electronic device 1 by the main processor 20, is used as a work area of the main processor 20, and temporarily stores the operation result of the main processor 20, manipulation data from the manipulator 21, and the like.

Next, three examples will be described. In the description of each of the examples, a correlation code used in the example, the configuration of the GPS receiver 10 according to the example, and a baseband processing flow will be described. After the three examples are described, test results of each of the three examples will be described.

First Example

First, a first example will be described.
Correlation Code

Figure 4:
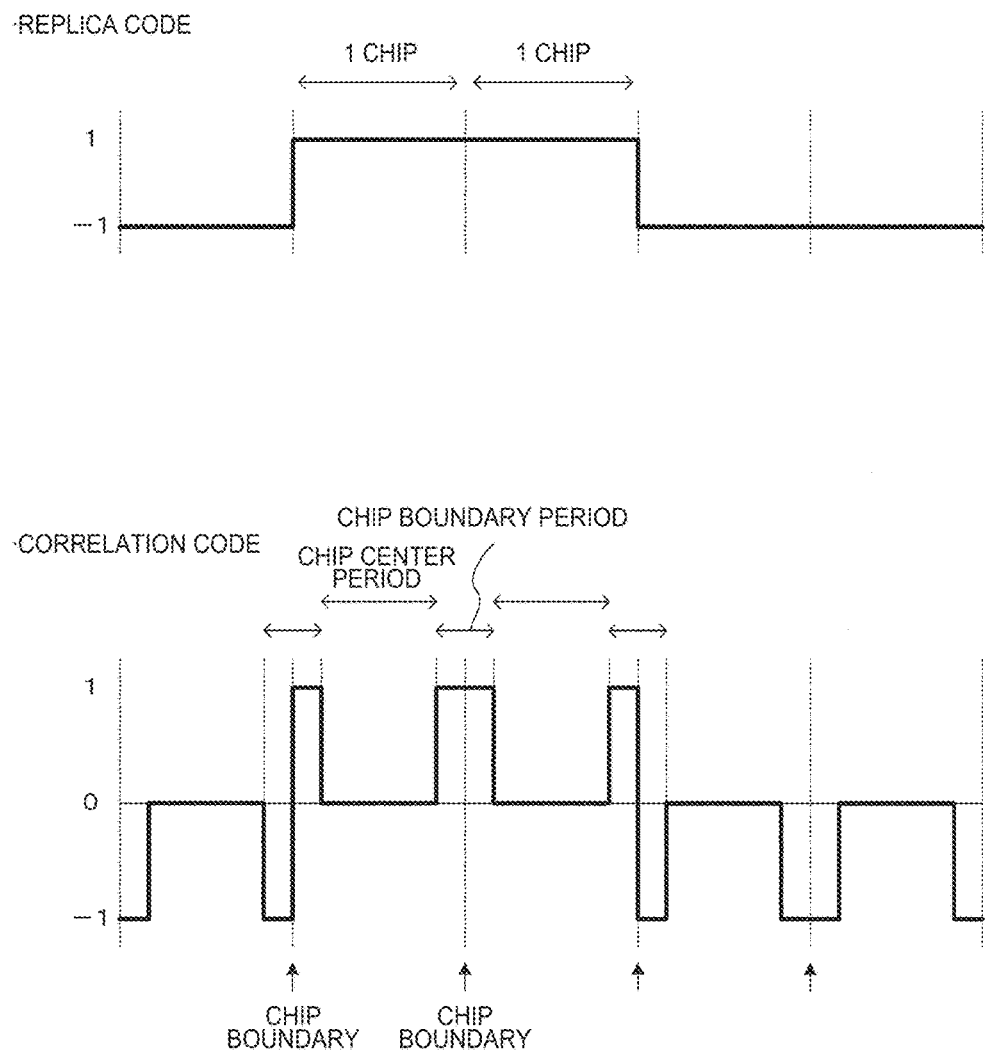
FIG. 4 is an explanatory diagram of a correlation code of a first example.

FIG. 4 is a diagram illustrating a correlation code of a first example. FIG. 3 illustrates an example of a replica code on the upper side and illustrates a correlation code based on the replica code on the lower side.

The replica code is intrinsic series (a gold code) in which the value of a chip is configured of any one of "1" and "−1", and is determined for each GPS satellite.

In the correlation code of the first example, a code value of a chip boundary period according to a chip boundary of a replica code is set to a value of a corresponding replica code, and a code value of a chip center period which is a period other than the chip boundary period is set to zero. For example, in a chip boundary where the code value of the replica code is transitioned from "−1" to "1", the code value of the correlation code is also changed from "−1" to "1". In addition, in a chip boundary where the code value of the replica code is not transitioned but remains as "−1" or "1", the code value of the correlation code is not changed but also remains as the value of the replica code. However, the code value of the chip center period between the chip boundaries is constant as zero. In other words, in each of the chips of the replica code, a code in which only a short period of a front portion and a back portion of each of the chips is set to the code value of the replica code, and the code value of the other period (the center period of each of the chips) is set to zero is the correlation code of the first example.

The length of the chip boundary period and the chip center period is able to be suitably set, and for example, the length of the chip boundary period is able to be the length of 0.2 chips, and the length of the chip center period is able to be the length of 0.8 chips.

Configuration

Figure 5:
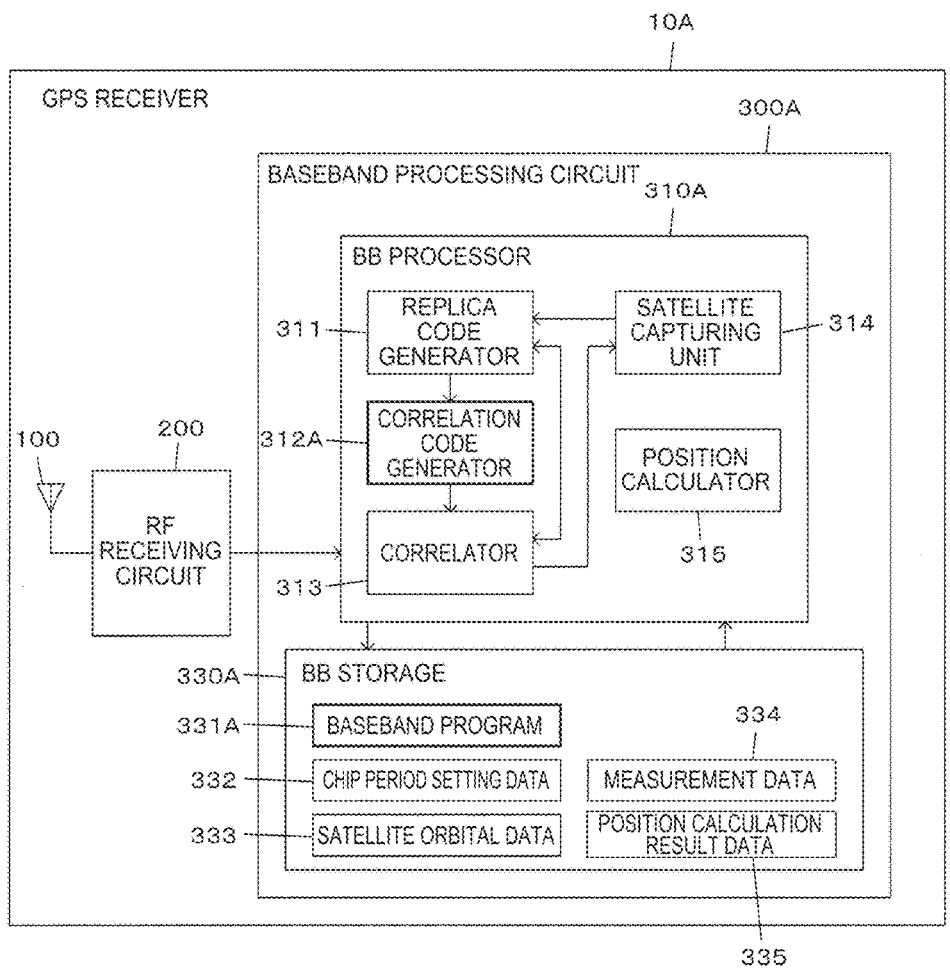
FIG. 5 is a functional configuration diagram of a GPS receiver of the first example.

FIG. 5 is a functional configuration diagram of a GPS receiver 10A of the first example. According to FIG. 5, the GPS receiver 10A includes a GPS antenna 100, an RF receiving circuit 200, and a baseband processing circuit 300A. Furthermore, the RF receiving circuit 200 and the baseband processing circuit 300A are able to be respectively manufactured as separate Large Scale Integration (LSI) circuits, and are able to be manufactured as one chip.

The GPS antenna 100 is an antenna which receives a Radio Frequency (RF) signal including the GPS satellite signal transmitted from the GPS satellite. The RF receiving circuit 200 down-converts the RF signal received by the GPS antenna 100 into a signal having an intermediate frequency, performs amplification or the like with respect to the signal, and then outputs the signal by converting the signal into a digital signal. Furthermore, a direct conversion method is able to be adopted in which the RF signal is not down-converted into the signal having an intermediate frequency, but is converted into a direct baseband signal.

The baseband processing circuit 300A includes a BB processor 310A and a BB storage 330A, captures a GPS satellite signal by using data of a received signal from the RF receiving circuit 200, and calculates the position error of the GPS receiver or the error of the timepiece as a positioning result by using time information, satellite orbital information, or the like obtained from the captured GPS satellite signal. The baseband processing circuit 300A corresponds to the correlation processing circuit.

The BB processor 310A is realized by a processor such as a CPU or a DSP, and integrally controls each unit of the baseband processing circuit 300A. In addition, the BB processor 310A includes a replica code generator 311, a correlation code generator 312A, a correlator 313, a satellite capturing unit 314, and a position calculator 315.

The replica code generator 311 generates a replica code corresponding to a Pseudo Random Noise (PRN) number (a satellite number) which is designated by the satellite capturing unit 314. Furthermore, in order to capture the GPS satellite signal, as with the related art, the replica code is generated by changing the frequency or the phase shift quantity of the replica code, but for the sake of simplicity of the description, the detailed description thereof will be omitted.

The correlation code generator 312A generates the correlation code along with the replica code generated by the replica code generator 311. Specifically, as illustrated in FIG. 4, in the chip boundary period, the correlation code is generated by setting the value of the replica code to the code value, and in the chip center period, the correlation code is generated by setting the code value to zero.

Here, the length of each of the chip boundary period and the chip center period is determined as the chip period setting data. FIG. 6 is a diagram illustrating an example of a data configuration of chip period setting data 332. According to FIG. 6, in each period of the chip boundary period and the chip center period, the chip period setting data 332 determines the length of the period as a ratio with respect to the chip period by using a starting time point of the chip as a starting point.

Furthermore, an internal clock signal of the BB processor 310A is used for measuring the length of the period or the timing. The period of the clock signal is constant, and thus, it is possible to determine the length of each of the periods or an approaching timing (the starting time point of the chip, and the like) by counting a signal change in the clock signal.

The correlator 313 performs the correlation calculation with respect to the received code signal obtained by demodulating the received signal and the correlation code generated by the correlation code generator 312A.

The satellite capturing unit 314 captures the GPS satellite. Specifically, the PRN number, the frequency, and the phase shift quantity of the GPS satellite of the capturing target are designated in the replica code generator 311, a corresponding replica code is generated, the correlation code according to the replica code is generated in the correlation code generator 312A, and the correlation code and the received signal are subjected to the correlation calculation by the correlator 313. A series of processes is repeated while changing the frequency and the phase shift quantity of the replica code generated in the replica code generator 311, and it is determined whether or not the GPS satellite signal is captured according to whether or not the peak of the correlation value which is the correlation calculation result of the correlator 313 is greater than or equal to a threshold value. When it is determined that the GPS satellite is captured, the frequency and the phase at which the peak of the correlation value is detected are respectively set to the receiving frequency and the code phase of the captured GPS satellite signal.

The position calculator 315 obtains satellite orbital data 333 from the GPS satellite signal captured by the satellite capturing unit 314, or performs position calculation processing using measurement data 334 which includes the receiving frequency and the code phase of the captured GPS satellite signal, and thus, calculates the position error of the GPS receiver 10 or the error of the timepiece error (a clock bias). For example, a known method such as a least squares method or a Kalman filter is able to be applied as the position calculation processing.

The position error and the error of the timepiece calculated by the position calculator 315 are accumulated and stored as position calculation result data 335. In addition, the satellite orbital data 333 is data such as almanac or ephemeris, and is obtained by decoding the received GPS satellite signal. The measurement data 334 is data of the receiving frequency or the code phase of the received GPS satellite signal and a Doppler frequency, and is obtained on the basis of the correlation calculation result of the correlator 313.

The BB storage 330A is realized by a storage device such as a ROM or a RAM, stores a system program for integrally controlling the baseband processing circuit 300A by the BB processor 310A or a program, data, or the like for realizing the various functions, is used as a work area of the BB processor 310A, and temporarily stores the operation result or the like of the BB processor 310A. In addition, the BB processor 310A stores a baseband program 331A, the chip period setting data 332, the satellite orbital data 333, the measurement data 334, and the position calculation result data 335.

Processing Flow

Figure 7:
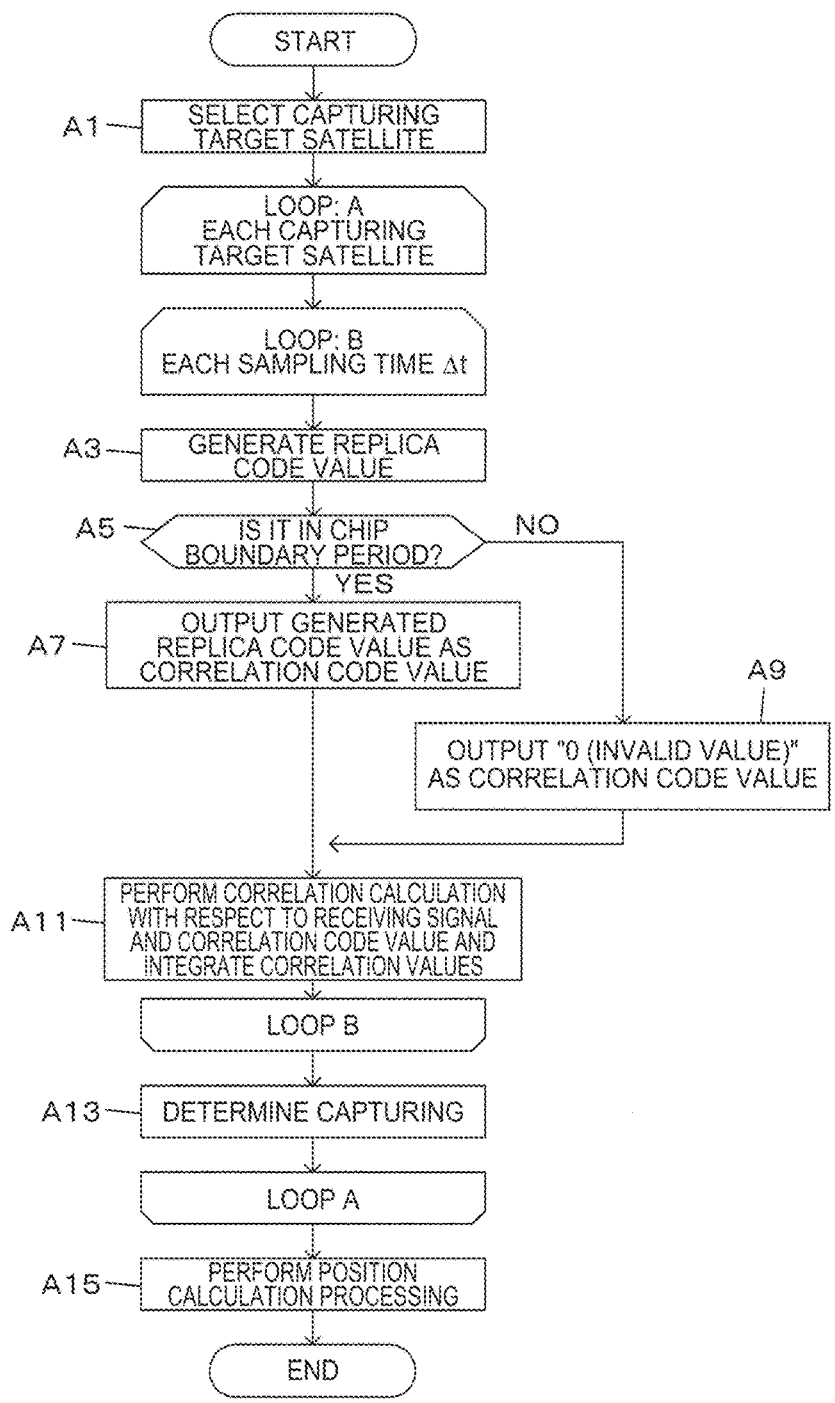
FIG. 7 is a flowchart of baseband processing of the first example.

FIG. 7 is a flowchart illustrating a baseband processing flow of the first example. The processing is processing executed by the BB processor 310A according to the baseband program 331A.

First, the BB processor 310A selects a GPS satellite (a capturing target satellite) of a capturing target (Step A1). Then, processing of a loop A is performed in which each selected capturing target satellite is set to a target. In the loop A, processing of a loop B is repeated at a predetermined sampling period interval in a predetermined period (for example, a C/A code number period). Here, the sampling interval is measured by counting the clock signal of the BB processor 310A. For example, the sampling interval is able to be set to a time interval of a 1023-rd part of one chip. Hereinafter, the processing timing of the loop B will be described by being referred to as a "sample timing".

In the loop B, first, the replica code generator 311 generates the value of the replica code corresponding to the PRN number of the capturing target satellite (Step A3). Next, the correlation code generator 312A determines whether the sample timing is the chip boundary period or the chip center period, and generates the correlation code value according to the determined period. That is, when the sample timing is the chip boundary period (Step A5: YES), the value of the replica code is set to the code value of the correlation code (Step A7). In contrast, when the sample timing is not the chip boundary period, that is, the sample timing is the chip center period (Step A5: NO), the code value of the correlation code is set to zero (Step A9). Then, the correlator 313 performs the correlation calculation with respect to the received code signal and the generated correlation code value, and integrates the obtained correlation values (Step A11). The loop B is performed as described above.

When the processing of the loop B over a predetermined period ends, the satellite capturing unit 314 detects the peak of the obtained correlation value, and thus, determines whether or not the capturing target satellite of the target is able to be captured (Step A13). The loop A is performed as described above.

When the processing of the loop A ends in which all of the capturing target satellites are set to a target, the position calculator 315 performs position calculation processing with respect to each of the GPS satellites which are able to be captured by using the obtained satellite orbital data or measurement data, and calculates the position error of the GPS receiver 10A or the error of the timepiece (the clock bias) (Step A15). When the processing described above is performed, the BB processor 310A ends the baseband processing.

Second Example

Next, a second example will be described. Furthermore, hereinafter, the same codes are applied to the same constituents as those of the first example described above, and the detailed description will be omitted or simplified.

Correlation Code

Figure 8:
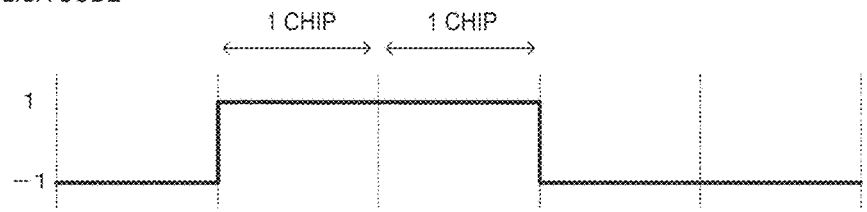
FIG. 8 is an explanatory diagram of a correlation code of a second example.
Figure 8:
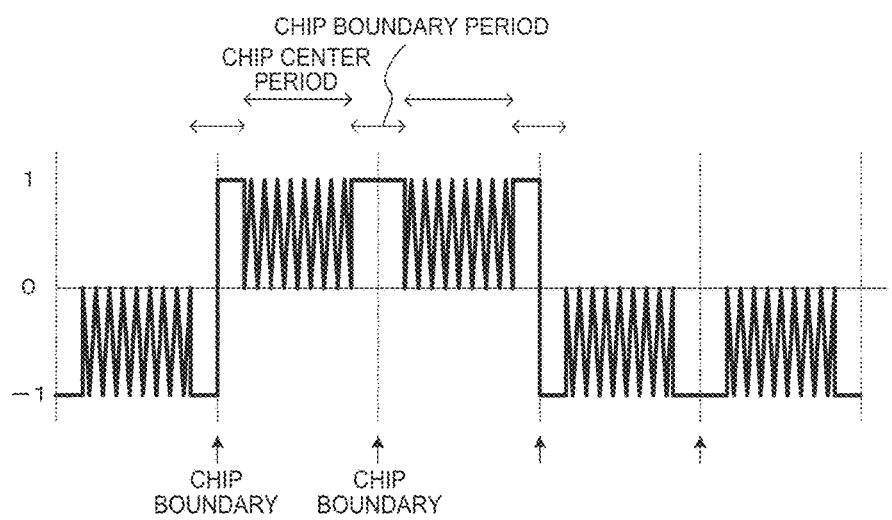

FIG. 8 is a diagram illustrating a correlation code of the second example. FIG. 8 illustrates an example of a replica code on the upper side, and illustrates a correlation code based on the replica code on the lower side.

In the correlation code of the second example, a code value of a chip boundary period according to a chip boundary of a replica code is set to a value of a corresponding replica code. Then, a code value of a chip center period is set to repetition of the value of the corresponding replica code and zero.

Configuration

Figure 9:
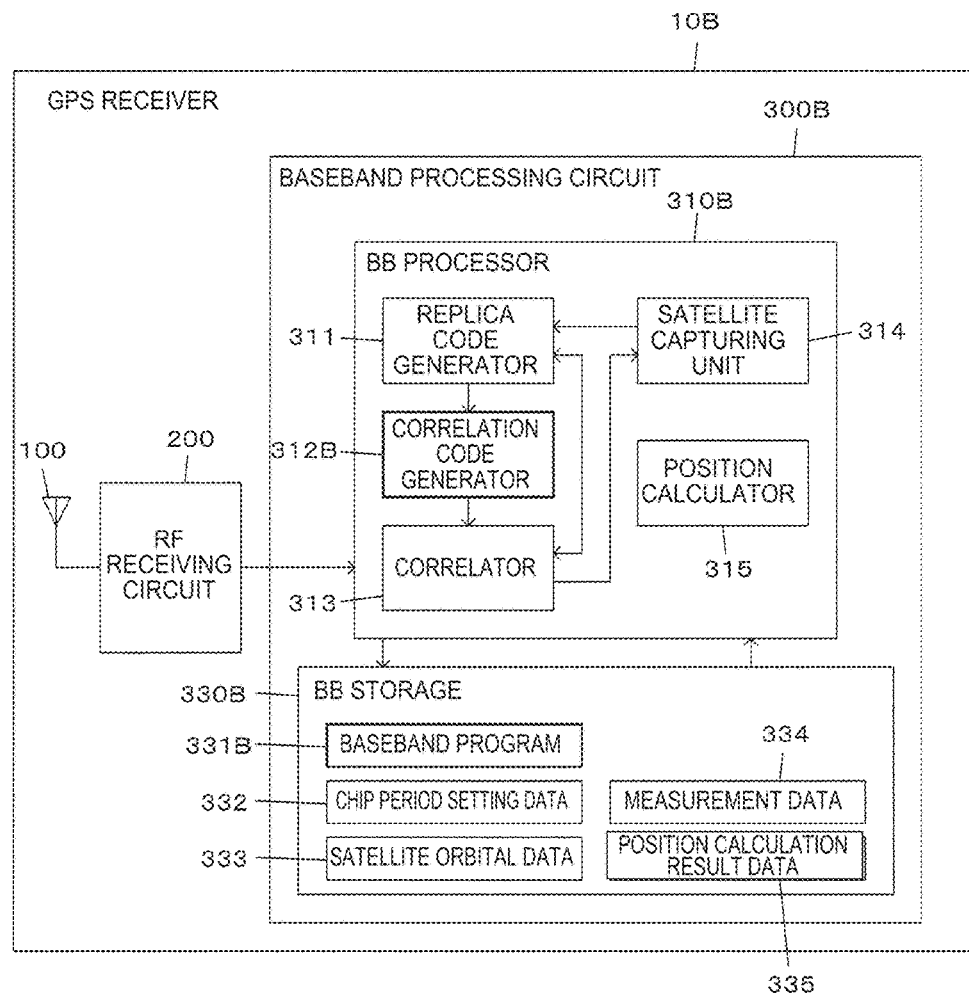
FIG. 9 is a functional configuration diagram of a GPS receiver of the second example.

FIG. 9 is a functional configuration diagram of a GPS receiver 10B of the second example.

A correlation code generator 312B generates the correlation code along with the replica code generated by the replica code generator 311. Specifically, as illustrated in FIG. 8, in the chip boundary period, the correlation code is generated by setting the value of the replica code to the code value, and in the chip center period, the correlation code is generated by determining the code value such that the value of the replica code and zero are repeated at a predetermined sampling time interval. The sampling time interval is able to be determined from a clock signal as with the first example, and for example, an approaching time interval of a clock timing is able to be set to the sampling time interval.

Processing Flow

Figure 10:
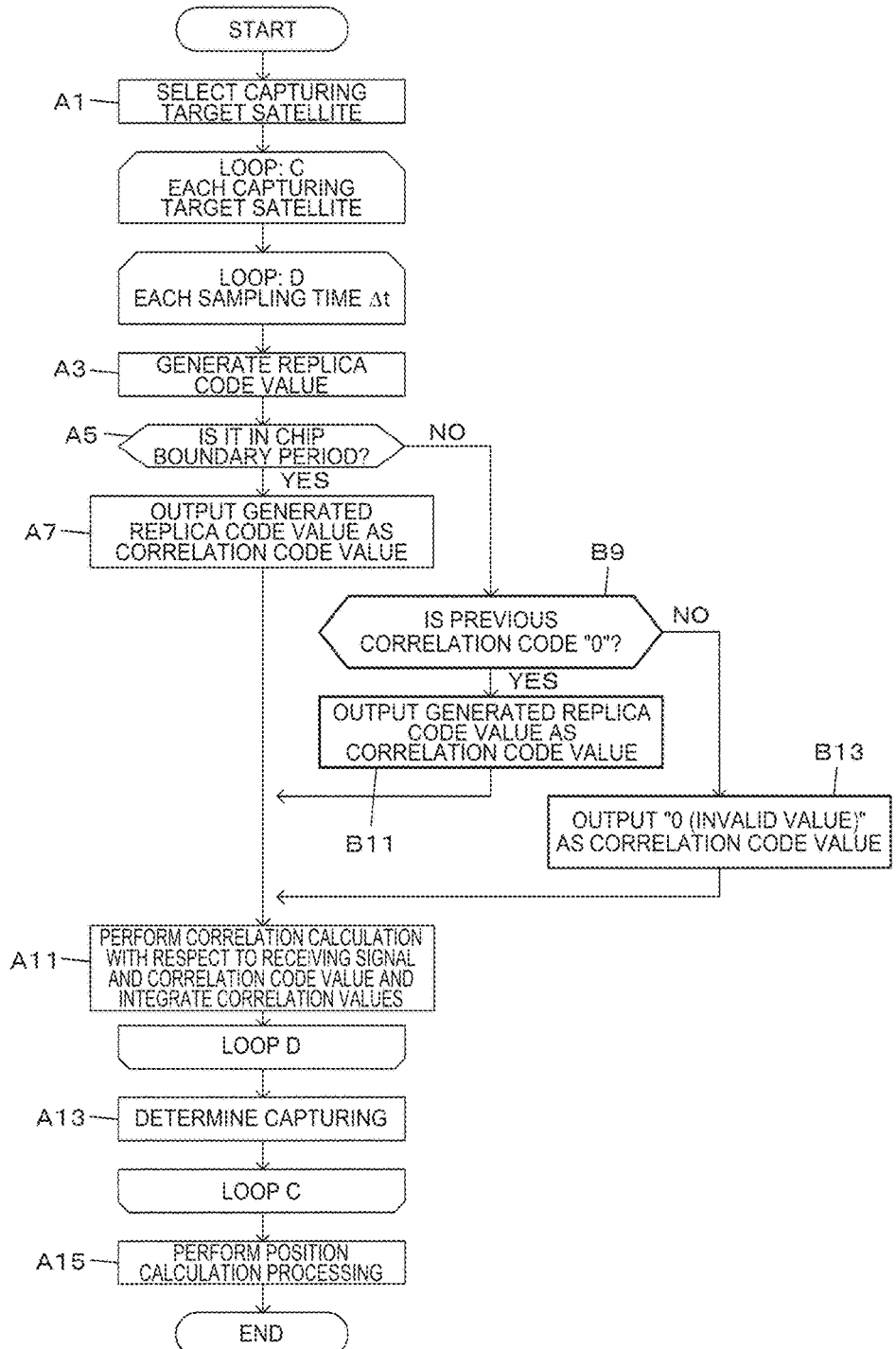
FIG. 10 is a flowchart of baseband processing of the second example.

FIG. 10 is a flowchart illustrating a baseband processing flow of the second example. The processing is processing executed by a BB processor 310B according to a baseband program 331B.

First, the BB processor 310B of a baseband processing circuit 300B selects a GPS satellite (a capturing target satellite) of a capturing target (Step A1). Then, processing of a loop C is performed in which each selected capturing target satellite is set to a target. In the loop C, processing of a loop D is repeated at a predetermined sampling time interval in a predetermined period (for example, a C/A code number period). Here, the sampling time is measured by counting the clock signal as with the first example. For example, the time interval is able to be set to a time interval of a 1023-rd part of one chip. Hereinafter, the processing timing of the loop D will be described by being referred to as a "sample timing".

In the loop D, first, the replica code generator 311 generates the value of the replica code corresponding to the PRN number of the capturing target satellite (Step A3). Next, the correlation code generator 312B determines whether the sample timing is the chip boundary period or the chip center period, and generates the correlation code value according to the determined period.

That is, when the sample timing is the chip boundary period (Step A5: YES), the value of the replica code is set to the code value of the correlation code (Step A7). In contrast, when the sample timing is not the chip boundary period, that is, the sample timing is the chip center period (Step A5: NO), a current correlation code value is determined according to the previous correlation code value. That is, when the previous correlation code value is "0" (Step B9: YES), the value of the replica code is set to the code value of the correlation code (Step B11), and when the previous correlation code value is not "0" (Step B9: NO), the code value of the correlation code is set to zero (Step B13). Accordingly, the correlation code in which the value of the replica code and zero are repeated at the predetermined sampling time interval is able to be generated by the code value of the chip center period. Then, the correlator 313 performs the correlation calculation with respect to a received code signal and the generated correlation code value, and integrates the obtained correlation values (Step A11). The loop D is performed as described above.

When the processing of the loop D over a predetermined period ends, the satellite capturing unit 314 detects the peak of the obtained correlation value, and thus, determines whether or not the capturing target satellite of the target is able to be captured (Step A13). The loop C is performed as described above.

When the processing of the loop C ends in which all of the capturing target satellites are set to a target, the position calculator 315 performs position calculation processing with respect to each of the GPS satellites which are able to be captured by using the obtained satellite orbital data or measurement data, and calculates the position error of the GPS receiver 10B or the error of the timepiece (the clock bias) (Step A15). When the processing described above is performed, the BB processor 310B ends the baseband processing.

Third Example

Next, a third example will be described. Furthermore, hereinafter, the same codes are applied to the same constituents as those of the first example and the second example described above, and the detailed description will be omitted or simplified.

Correlation Code

Figure 11:
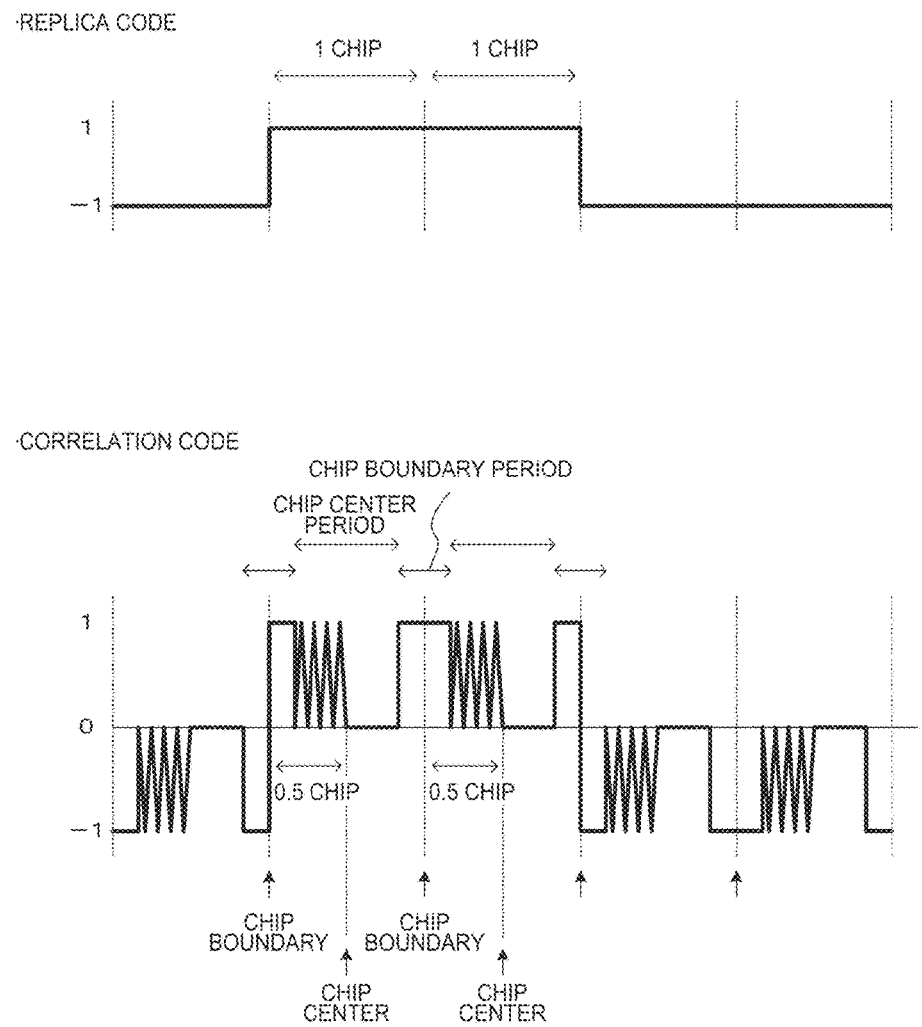
FIG. 11 is an explanatory diagram of a correlation code of a third example.

FIG. 11 is a diagram illustrating a correlation code of the third example. FIG. 11 illustrates an example of a replica code on the upper side, and illustrates a correlation code based on the replica code on the lower side.

In the correlation code of the third example, a code value of a chip boundary period according to a chip boundary of a replica code is set to a value of a corresponding replica code. Then, in the chip center period, the code value of the first half period of the chip center period (a period from the chip boundary which is a starting point to a chip center time point which is an elapsed time point of 0.5 chip: the first period) is set to repetition of the value of the replica code and zero, and the code value of the latter half period of the chip center period is set to zero.

Configuration

Figure 12:
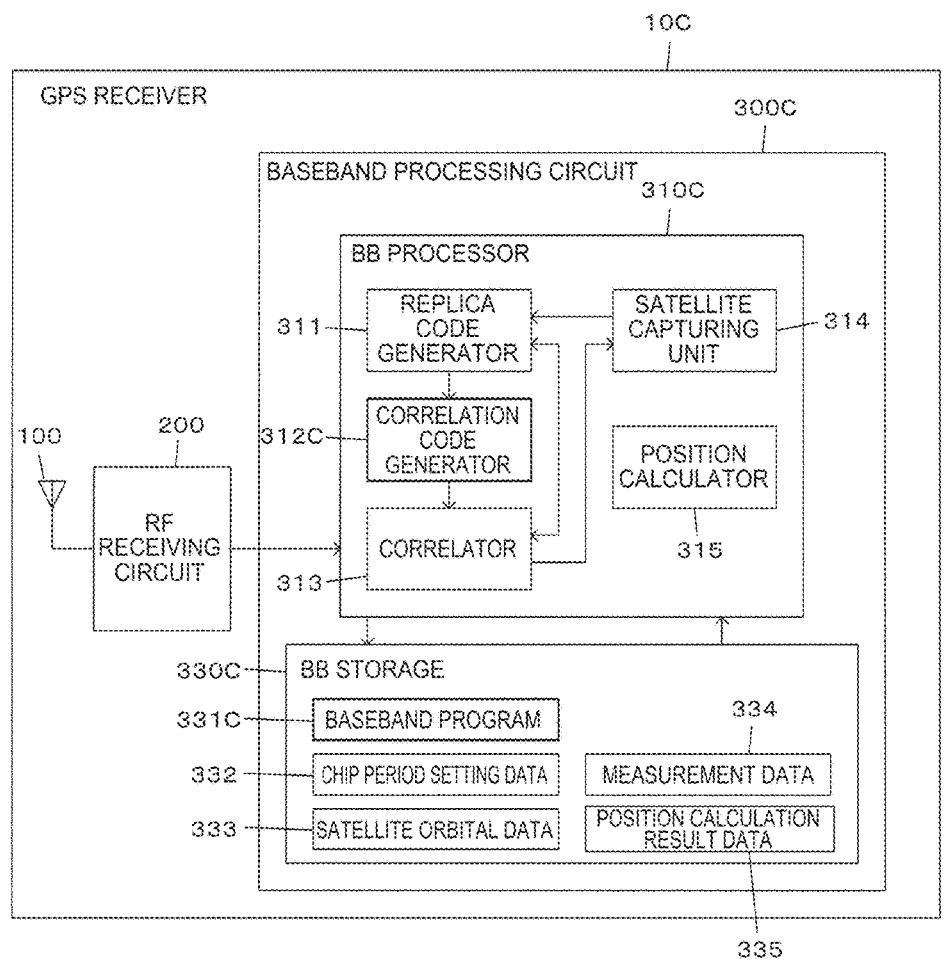
FIG. 12 is a functional configuration diagram of a GPS receiver of the third example.

FIG. 12 is a functional configuration diagram of a GPS receiver 10C of the third example.

A correlation code generator 312C generates the correlation code along with the replica code generated by the replica code generator 311. Specifically, as illustrated in FIG. 11, in the chip boundary period, the correlation code is generated by setting the value of the replica code to the code value. In addition, in the chip center period, the correlation code is generated by setting the first half period to repetition of the value of the replica code and zero at a predetermined sampling time interval, and by setting the latter half period to zero. The sampling time interval is able to be determined from a clock signal as with the first example, and for example, an approaching time interval of a clock timing is able to be set to the sampling time interval.

Processing Flow

Figure 13:
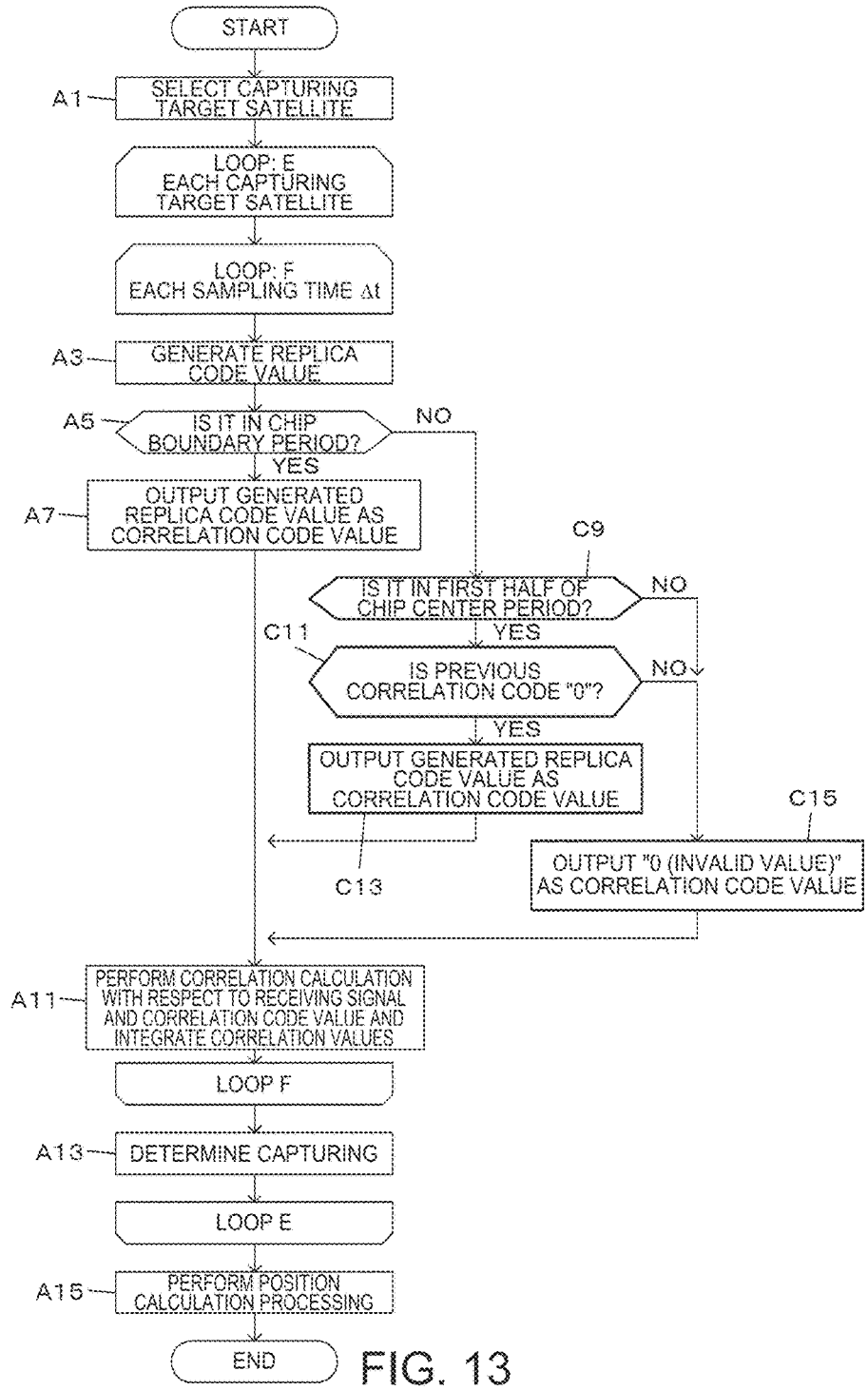
FIG. 13 is a flowchart of baseband processing of the third example.

FIG. 13 is a flowchart illustrating a baseband processing flow of the third example. The processing is processing executed by a BB processor 310C according to a baseband program 331C.

First, the BB processor 310C of a baseband processing circuit 300C selects a GPS satellite (a capturing target satellite) of a capturing target (Step A1). Then, processing of a loop E is performed in which each selected capturing target satellite is set to a target. In the loop E, processing of a loop F is repeated at a predetermined sampling time interval in a predetermined period (for example, a C/A code number period). Here, the sampling time is measured by counting the clock signal as with the first example. For example, the time interval is able to be set to a time interval of a 1023-rd part of one chip. Hereinafter, the processing timing of the loop E will be described by being referred to as a "sample timing".

In the loop F, first, the replica code generator 311 generates the value of the replica code corresponding to the PRN number of the capturing target satellite (Step A3). Next, the correlation code generator 312C determines whether the sample timing is the chip boundary period or the chip center period, and generates the correlation code value according to the determined period.

That is, when the sample timing is the chip boundary period (Step A5: YES), the value of the replica code is set to the code value of the correlation code (Step A7). In contrast, when the sample timing is not the chip boundary period, that is, the sample timing is the chip center period (Step A5: NO), it is further determined whether the sample timing is the first half period or the latter half period of the chip center period. When the sample timing is the first half period (Step C9: YES), a current correlation code value is determined according to the previous correlation code value. That is, when the previous correlation code value is "0" (Step C11: YES), the value of the replica code is set to the code value of the correlation code (Step C13), and when the previous correlation code value is not "0" (Step C11: NO), the code value of the correlation code is set to zero (Step C15). Accordingly, the correlation code in which the value of the replica code and zero are repeated at the predetermined sampling time interval is able to be generated by the code value of the first half period of the chip center period. In contrast, when the sample timing is not the first half period of the chip center period (Step C9: NO), the code value of the correlation code is set to zero (Step C15). Then, the correlator 313 performs the correlation calculation with respect to a received code signal and the generated correlation code value, and integrates the obtained correlation values (Step A11). The loop F is performed as described above.

When the processing of the loop F over a predetermined period ends, the satellite capturing unit 314 detects the peak of the obtained correlation value, and thus, determines whether or not the capturing target satellite of the target is able to be captured (Step A13). The loop E is performed as described above.

When the processing of the loop E ends in which all of the capturing target satellites are set to a target, the position calculator 315 performs position calculation processing with respect to each of the GPS satellites which are able to be captured by using the obtained satellite orbital data or measurement data, and calculates the position error of the GPS receiver 10C or the error of the timepiece (the clock bias) (Step A15). When the processing described above is performed, the BB processor 310C ends baseband processing C.

Test Result

Figure 14:
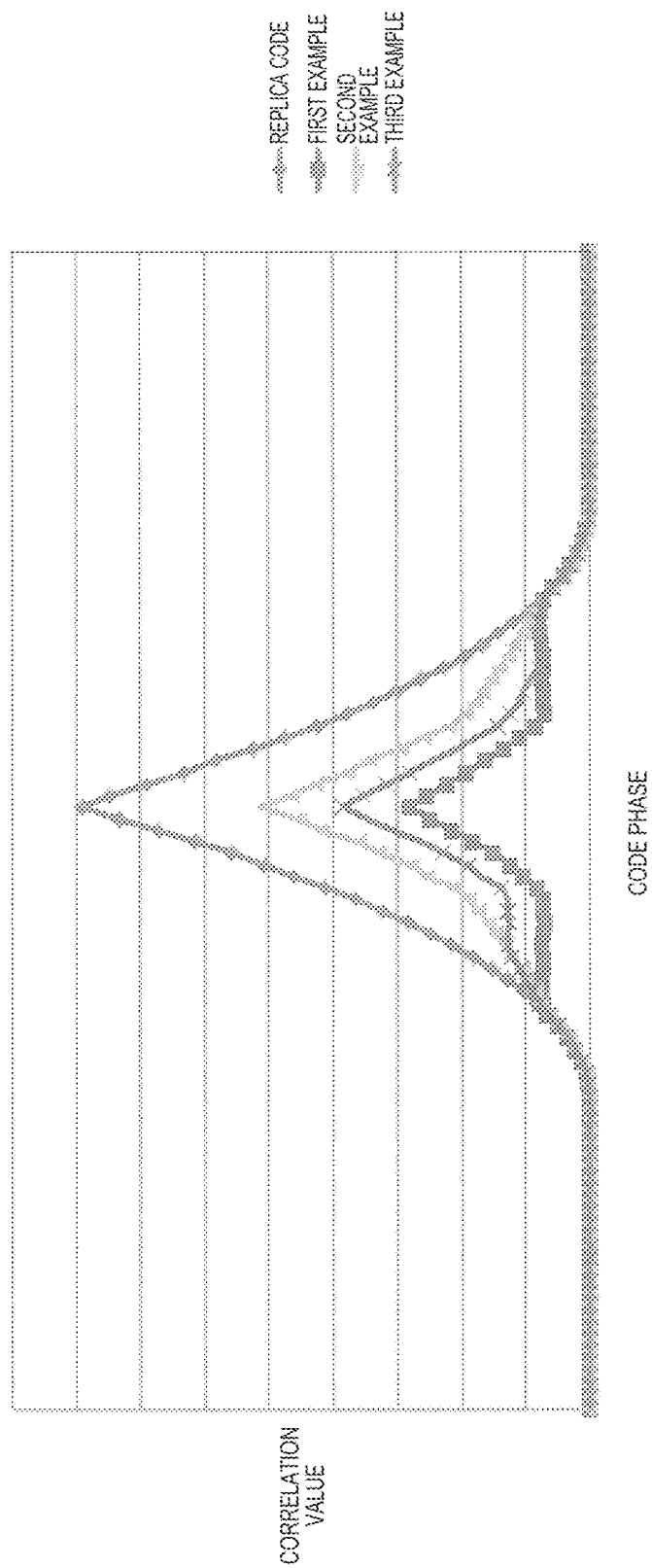
FIG. 14 is an example of a correlation result between a direct wave signal and a correlation code.
Figure 15:
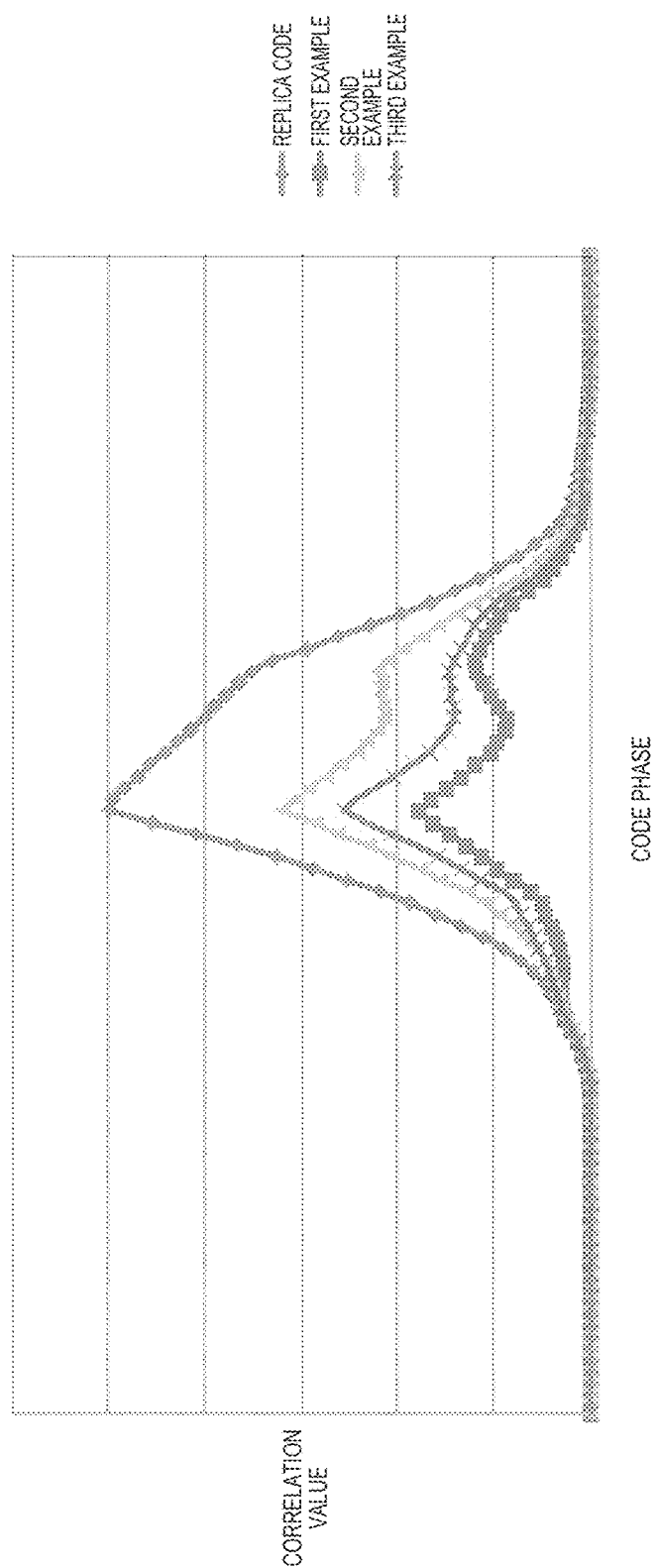
FIG. 15 is an example of a correlation result between a multipath signal and a correlation code.

Subsequently, test results of each of the first example to the third example will be described. In this test, when each of the direct wave signal and the multipath signal is set to the received signal, the correlation calculation with respect to the correlation code of each of the first example to the third example is performed. FIG. 14 illustrates a correlation result with respect to the direct wave signal, and FIG. 15 illustrates a correlation result with respect to the multipath signal. In both of FIG. 14 and FIG. 15, a horizontal axis indicates a phase (a code phase) and a vertical axis indicates a correlation value, and total four graphs including a graph of a case where the correlation value is calculated by the replica code as with the related art, and graphs of a case where the correlation value is calculated by the correlation code of each of the first example to the third example, are illustrated.

As illustrated in FIG. 14, in the correlation value with respect to the direct wave signal, the peak phases are approximately coincident with each other in both of a case where the replica code is used as the correlation code and a case where the correlation code of the first example to the third example is used as the correlation code. In addition, in all of the graphs, a peak portion is approximately in the shape of an isosceles triangle in which the peak phase is the vertex, and the inclinations of the correlation values on the right and left of the peak value are approximately identical to each other. For this reason, the peak phase is accurately detected by using any correlation code of the first example to the third example. However, the size of the peak value increases in the order of the replica code, the correlation code of the second example, the correlation code of the third example, and the correlation code of the first example. This is because a time (the number of times in the sample timing) at which the code value of each chip is zero time is different.

As illustrated in FIG. 15, in the correlation result with respect to the multipath signal, the peak phases themselves are approximately coincident with each other in all of the graphs. In addition, in all of the graphs, a phase delayed from the peak phase is affected by the indirect wave signal included in the multipath signal. However, the shapes of the peak portions are considerably different from each other. First, in the graph of the correlation value using the replica code, the inclinations of the correlation values on the right and left (the front and rear) of the peak phase are considerably different from each other. In contrast, in the graph of the correlation value using the correlation code of the first example to the third example, the inclinations of the correlation values on the right and left (the front and rear) of the peak phase are slightly different from each other, and are approximately in the shape an isosceles triangle, and thus, it is found that enhancement is obtained compared to a case where the replica code is used. Accordingly, it is found that detection accuracy of the peak phase is enhanced by using the correlation code of the first example to the third example.

More specifically, in the shape of the peak portion, when the correlation values using the correlation codes each of the first example to the third example are compared to each other, in the correlation value using the correlation code of the first example, the inclinations of the correlation values on the right and left of the peak value are least different from each other, but the correlation value has the smallest size. In contrast, in the correlation value using the correlation code of the second example, the inclinations of the correlation values on the right and left of the peak value are the most different from each other among the three examples, but the correlation value has the largest size. That is, a suitable correlation code is able to be selected from the correlation codes of the first example to the third example in consideration of the size of a correlation value which is able to be detected or detection accuracy (a multipath influence reduction effect) of a peak phase to be obtained. However, reception sensitivity may deteriorate by decreasing the peak value of the correlation value, and thus, it is necessary to consider the deterioration of the reception sensitivity.

Figure 16:
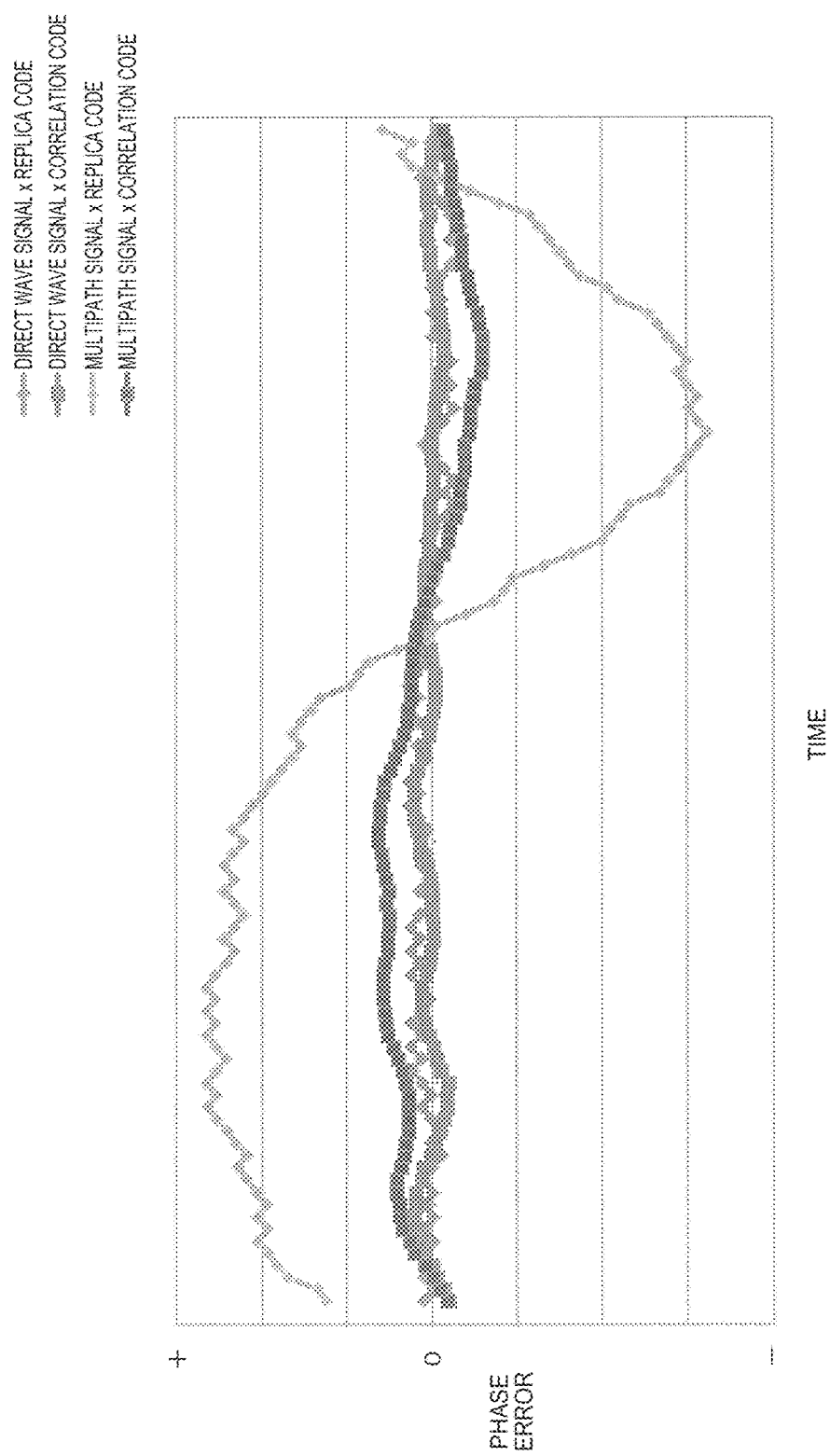
FIG. 16 is an example of a phase error at the time of using the correlation code of the first example.
Figure 17:
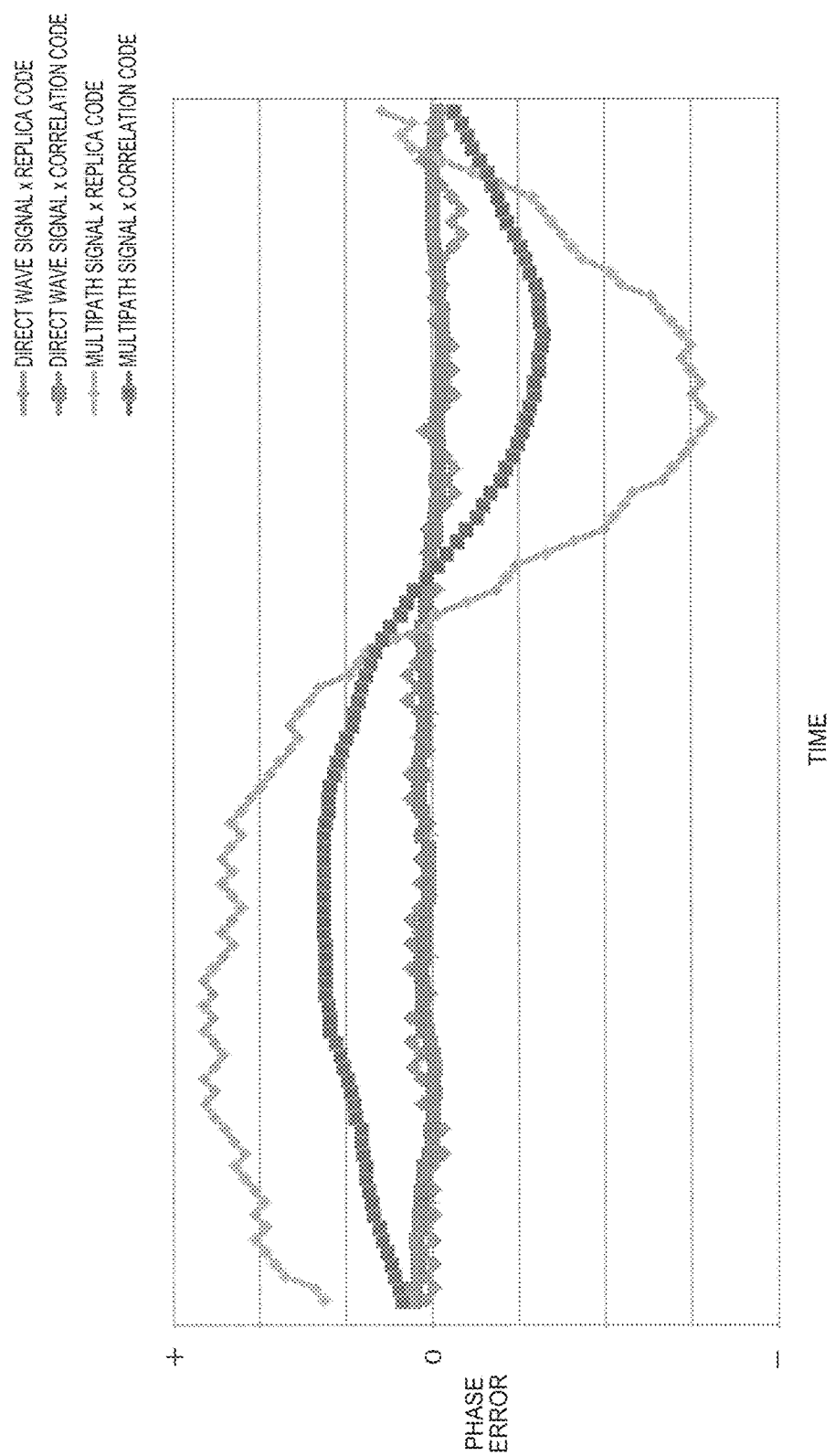
FIG. 17 is an example of a phase error at the time of using the correlation code of the second example.
Figure 18:
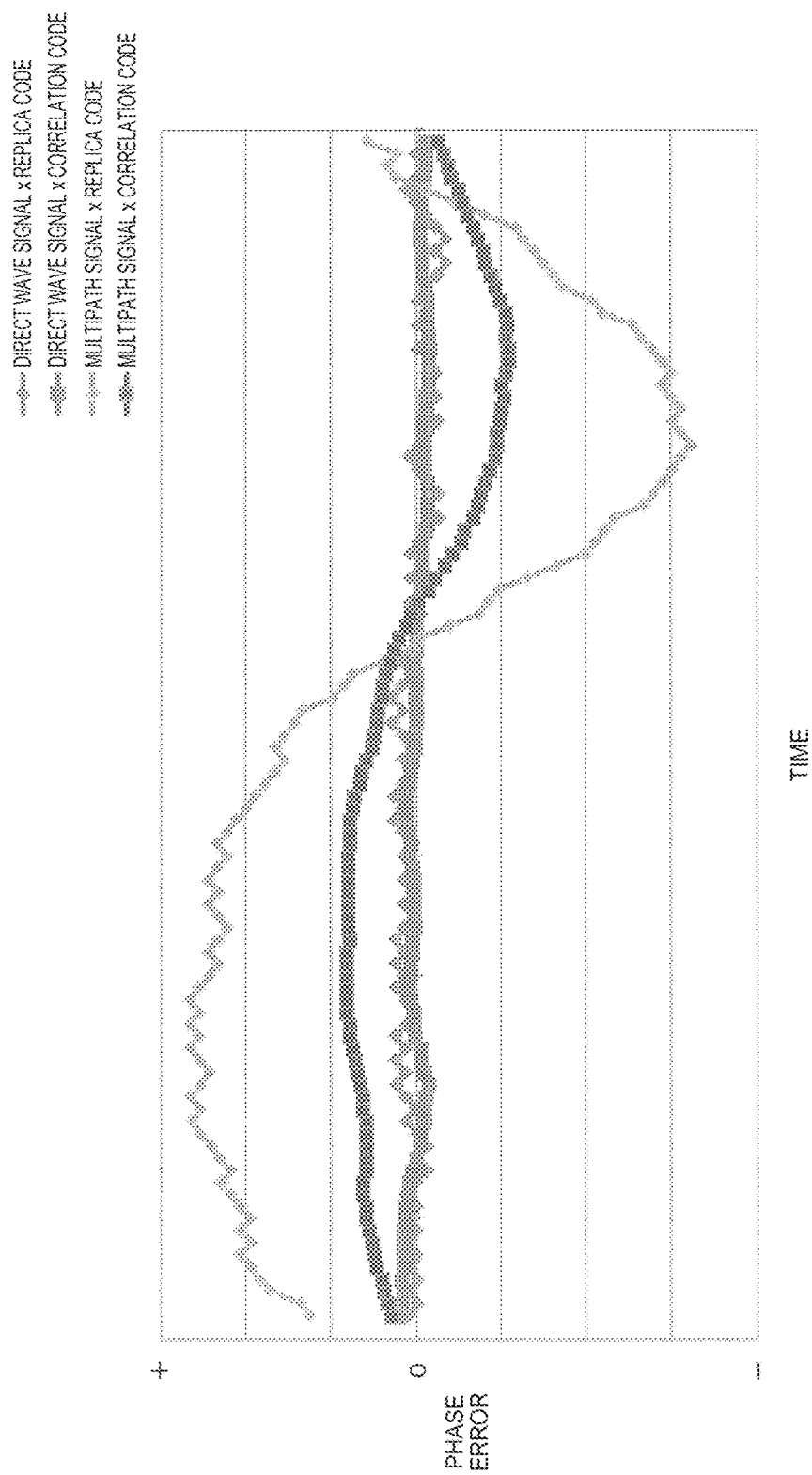
FIG. 18 is an example of a phase error at the time of using the correlation code of the third example.

FIG. 16 to FIG. 18 are diagrams illustrating a temporal change of an error of the code phase (a phase error) obtained from the correlation value. FIG. 16 illustrates the phase error at the time of using the correlation code of the first example, FIG. 17 illustrates the phase error at the time of using the correlation code of the second example, and FIG. 18 illustrates the phase error at the time of using the correlation code of the third example. In all of FIG. 16 to FIG. 18, a horizontal axis indicates a time and a vertical axis indicates a phase error, and four graphs including a graph of the phase error of the code phase obtained from the correlation result of the multipath signal and the correlation code, a graph of the phase error of the code phase obtained from the correlation result of the multipath signal and the replica code, a graph of the phase error of the code phase obtained from the correlation result of the direct wave signal and the correlation code, and a graph of the phase error of the code phase obtained from the correlation result of the direct wave signal and the replica code are illustrated.

As illustrated in FIG. 16 to FIG. 18, when either the replica code or the correlation code is used, the phase error with respect to the direct wave signal decreases, and a temporal change in the phase error also decreases. A considerable difference is not observed between a case where the replica code is used and a case where the correlation code is used. In contrast, the phase error with respect to the multipath signal is smaller in the case where the correlation code is used than in the case where the replica code is used, and a temporal change in the phase error is smaller in the case where the correlation code is used than in the case where the replica code is used, and thus, it is found that detection accuracy of the code phase is improved. Specifically, the phase error decreases in the order of the correlation code of the first example, the correlation code of the third example, the correlation code of the second example. As illustrated in FIG. 15, this is caused by a difference between the inclinations of the correlation values on the right and left of the peak phase, that is, a difference in the detection accuracy of the peak phase.

Functional Effect

Thus, in the GPS receiver 10 (10A to 10C) of this embodiment, when the GPS satellite signal is captured, the correlation code in which the code value of the chip boundary period is set to the value of the replica code, and the code value of the chip center period other than the chip boundary period is set to a predetermined value is used as the correlation code which is subjected to the correlation calculation with respect to the received code signal. Specifically, in the first example, the correlation code is used in which the code value of the chip center period is set to zero, in the second example, the correlation code is used in which the code value of the chip center period is set to repetition of the value of the replica code and zero, and in the third example, the correlation code is used in which the code value of the first half period of the chip center period is set to repetition of the value of the replica code and zero, and the code value of the latter half period of the chip center period is set to zero.

The indirect wave signal is a signal which is delayed with respect to the direct wave signal, and thus, in the multipath signal, the component of the indirect wave signal is mainly included in the latter half period of each chip. For this reason, the chip center period of the correlation code includes a period in which the code value becomes zero, and thus, the influence of the multipath which appears on the correlation value of the received code signal and the correlation code is able to be reduced. As a result thereof, detection accuracy of the code phase in a multipath environment is able to be improved.

In addition, the code value of the chip center period is not set to be constant as zero but is intermittently set to the value of the replica code, and thus, it is possible to increase the size of the correlation value obtained as a result of the correlation calculation. This is an effect of suppressing the deterioration of the reception sensitivity since it is possible to increase the correlation peak value compared to a case where the code value of the chip center period is set to be constant as zero.

Modification Example

Furthermore, an embodiment to which the disclosure is able to be applied is not limited to the embodiment described above, but suitable modification is able to be performed in a range not departing from the gist of the disclosure.

For example, in the second example and the third example, the code value of the chip center period of the correlation code is set to repetition of the value of the replica code and zero at a predetermined sampling time interval. That is, in this repetition period, a ratio of a time (also referred to as the number of times) at which the value of the replica code is obtained to a time (also referred to as the number of times) at which zero is obtained, is equalized. However, the ratio may be a different ratio of 0.25 to 0.75, or on the contrary, 0.75 to 0.25. For example, the value of the replica code is adopted as the code value of the correlation code at a ratio of one in four sample timings, and zero is adopted as the code value of the correlation code in the remaining three sample timings. Alternatively, the value of the replica code and the code value of the correlation code are able to be realized by adopting the converse.

In addition, in the third example, the replica code value and zero are repeated in the first half period which is half of the chip center period of the correlation code, but for example, a period (the first period) from the chip boundary to a time point of ⅓ chip may be a period in which the value of the replica code and zero are repeated without using the half period.

In addition, in the embodiment described above, the GPS is described as an example of the satellite positioning system, but other satellite positioning systems such as Wide Area Augmentation System (WAAS), a Quasi Zenith Satellite System (QZSS), a GLObal NAvigation Satellite System (GLONASS), GALILEO, and a BeiDou Navigation Satellite System may be used.

In addition, for example, the disclosure is able to be applied to various electronic devices such as a runner's watch, a portable navigation device, a personal computer, Personal Digital Assistant (PDA), a mobile telephone, a wristwatch, and smart glasses as the portable electronic device 1 to which the disclosure is able to be applied.

What is claimed is:

1. A correlation processing method for causing a processor to execute computer-readable instructions stored in a memory, the method comprising executing on the processor the steps of:

obtaining a satellite signal from a satellite;

generating a replica code, the replica code being configured with a plurality of chips that are continuously connected to each other via a plurality of chip boundaries, each period of the plurality of chips having one of a first code value and a second code value that is different from the first code value, each period of the plurality of chips being configured with a post-boundary period, a center period, and a pre-boundary period that are continuously connected to each other, the post-boundary period being located directly adjacent to and immediately after one of the plurality of chip boundaries, the pre-boundary period being located directly adjacent to and immediately prior to one of the plurality of chip boundaries;

generating a correlation code in which a code value corresponding to each of the post-boundary period and the pre-boundary period is set to a value of the replica code and in which a code value corresponding to the center period is set to a predetermined value pattern based on the replica code; and performing a correlation calculation by using the satellite signal and the correlation code so as to detect a distance between the satellite and a terminal device.

2. The correlation processing method according to claim 1, wherein the predetermined value pattern is a constant value of zero.

3. The correlation processing method according to claim 1, wherein part of the predetermined value pattern is an alternatively repeating value of the first code value and zero.

4. The correlation processing method according to claim 3, wherein an entirety of the predetermined value pattern is the alternatively repeating value of the first code value and zero.

5. The correlation processing method according to claim 3, wherein the center period is divided into first and second center periods that are continuously provided, the predetermined value pattern in the first center period is the alternatively repeating value of the first code value and zero, and the predetermined value pattern in the second center period is a constant value of zero.

6. A correlation processing circuit comprising:

a receiver that is configured to receive a satellite signal from a satellite, the satellite signal being modulated by a first code;

a memory that is configured to store computer-readable instructions; and a processor that is configured to execute the computer-readable instructions so as to:

generate a replica code, the replica code being configured with a plurality of chips that are continuously connected to each other via a plurality of chip boundaries, each period of the plurality of chips having one of a first code value and a second code value that is different from the first code value, each period of the plurality of chips being configured with a post-boundary period, a center period, and a pre-boundary period that are continuously connected to each other, the post-boundary period being located directly adjacent to and immediately after one of the plurality of chip boundaries, the pre-boundary period being located directly adjacent to and immediately prior to one of the plurality of chip boundaries;

generate a correlation code based on the replica code; and perform a correlation calculation by using the satellite signal and the correlation code so as to detect a distance between the satellite and a terminal device, wherein when two adjacent periods of the plurality of chips of the replica code are the first code values:

a code value of the correlation code corresponding to each of the post-boundary period and the pre-boundary period is the first code value; and a code value of the correlation code corresponding to the center period is a predetermined value pattern in each of the two adjacent periods.

7. The correlation processing circuit according to claim 6, wherein the predetermined value pattern is a constant value of zero.

8. The correlation processing circuit according to claim 6, wherein part of the predetermined value pattern is an alternately repeating value of the first code value and zero.

9. The correlation processing circuit according to claim 8, wherein an entirety of the predetermined value pattern is the alternately repeating value of the first code value and zero.

10. The correlation processing circuit according to claim 8,
wherein the center period is divided into first and second center periods that are continuously provided,
the predetermined value pattern in the first center period is the alternately repeating value of the first code value and zero, and
the predetermined value pattern in the second center period is a constant value of zero.

* * * * *